United States Patent [19]

Genter et al.

[11] 4,355,384

[45] Oct. 19, 1982

[54] NON-BLOCKING EXPANDABLE SWITCHING MATRIX FOR A TELECOMMUNICATION SYSTEM

[75] Inventors: Roland E. Genter, Falls Church, Va.; Steven R. Cook, Columbia, Md.

[73] Assignee: Digital Switch Corporation, Reston, Va.

[21] Appl. No.: 131,862

[22] Filed: Mar. 19, 1980

[51] Int. Cl.³ .................... H04Q 11/04; H04J 3/12
[52] U.S. Cl. .................................. 370/64; 370/58; 370/110.1
[58] Field of Search .................. 370/64, 66, 58, 109, 370/110, 111

[56] References Cited

U.S. PATENT DOCUMENTS

| | | | |
|---|---|---|---|
| 3,597,548 | 8/1971 | Drinnan et al. | 370/64 |
| 4,025,725 | 5/1977 | Euler | 370/66 |
| 4,245,339 | 1/1981 | Agricola et al. | 370/58 |

FOREIGN PATENT DOCUMENTS 2026285 1/1980 United Kingdom.

Primary Examiner—Douglas W. Olms
Attorney, Agent, or Firm—Cushman, Darby & Cushman

[57] ABSTRACT

A digital switching matrix for use in telephone systems which provides non-blocking operation and is capable of non-blocking expansion without reconfiguration of the existing system. A provision for providing message tones such as dial tone, business line, etc., without requiring a map search of the switching matrix, and an integral testing provision are also described.

23 Claims, 10 Drawing Figures

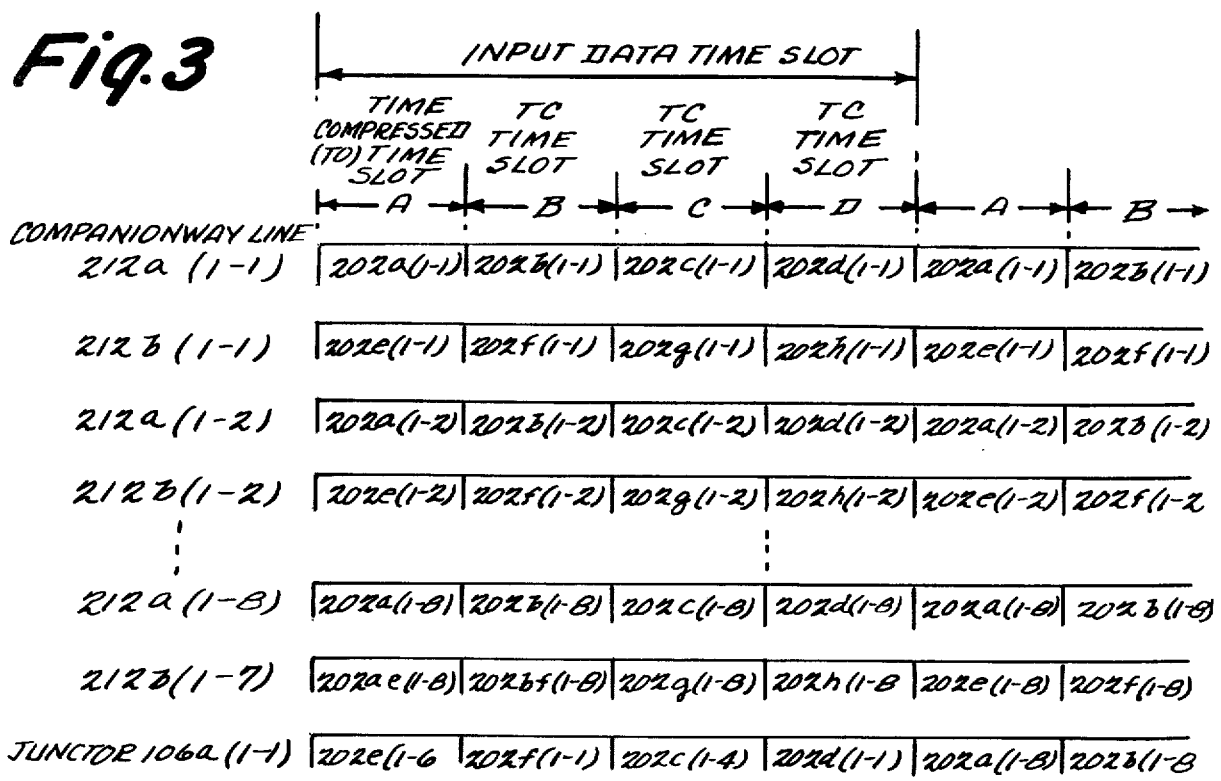
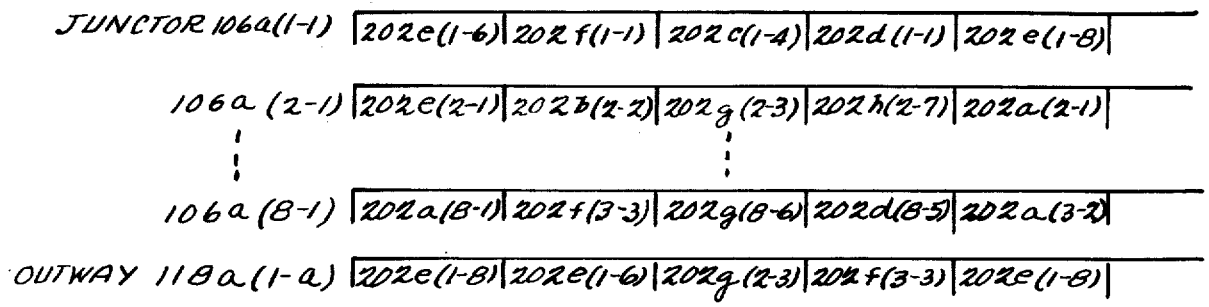

NON-BLOCKING EXPANDABLE SWITCHING MATRIX FOR A TELECOMMUNICATION SYSTEM

BACKGROUND OF THE INVENTION

The present invention relates to digital switches and in particular, to a non-blocking digital switching matrix for both time and space switching in a telephone system which can be expanded without requiring reconfiguration of existing data paths.

In general, computer control of line switching in digital communication systems is well known. Reference in this regard is made to Martin, "Telecommunications and the Computer", Prentice-Hall, 1969, and Joel, "Circuit Switching: Unique Architecture and Applications," Computer, June, 1979, pages 10–22. Digital switching matrices typically include components for time division multiplexing a plurality of channels onto a single line. In time division multiplexing digitized samples from each of the plurality of channels are provided on the common line in sequence. A "frame" of data is thus generated, comprising a plurality of data bytes generated on the commmon line during a plurality of time slots, each time slot associated with a particular channel in accordance with a relative position of the time slot within the frame.

The digital switching matrices typically also include space division stages which, during a given time slot, communicate a sample present on one line to a different line. An example of a 3-stage space division switching system is described in U.S. Pat. No. 3,458,658 to E. Aro, July 29, 1969.

Another component of typical switching systems is the so-called time slot interchange (TSI) circuit. Time slot interchange circuits typically store each of the data bytes (digital samples) in a frame and then output them in a different order, i.e. in a different relative time slot than in which received. TSI circuits also often include space switching capabilities. Such a TSI circuit is described in U.S. Pat. No. 3,715,505 issued Feb. 6, 1973 to Gordon et al.

It is desirable that the digital switching matrix be non-blocking, that is, that an effective connection can be made between any two channels without having to re-route existing connections in the matrix, regardless of effective connections already established. Non-blocking switching systems are discussed in "A Study of Non-Blocking Switching Networks" by Charles Clos, the Bell System Technical Journal, March 1953, pages 406–424. An example of a non-blocking digital switching system is described in U.S. Pat. No. 3,458,659 issued July 29, 1969 to S. Sternung.

It is desirable that a digital switch be capable of expansion while remaining non-blocking and not requiring reconfiguration of the existing system. Further, it is desirable that the digital switching system be of a modular architecture, so that the system may be expanded in stages.

SUMMARY OF THE INVENTION

The present invention provides a digital switching matrix for use in telephone systems which provides a non-blocking operation, and is capable of non-blocking expansion without requiring reconfiguration of the existing system. In addition, message tones such as dial tone, busy line tone, reorder tone, audible ring, etc. are provided without requiring a map search through the switching matrix by the system's central processing unit (and/or switch management microprocessor).

BRIEF DESCRIPTION OF THE DRAWINGS

FIGS. 3 and 3a are diagrammatic charts illustrating the operation of the multiplexing input circuit.

FIG. 5 is a diagrammatic chart illustrating the operation of the time slot interchanger of the present invention.

DETAILED DESCRIPTION OF THE INVENTION

Figure 1:
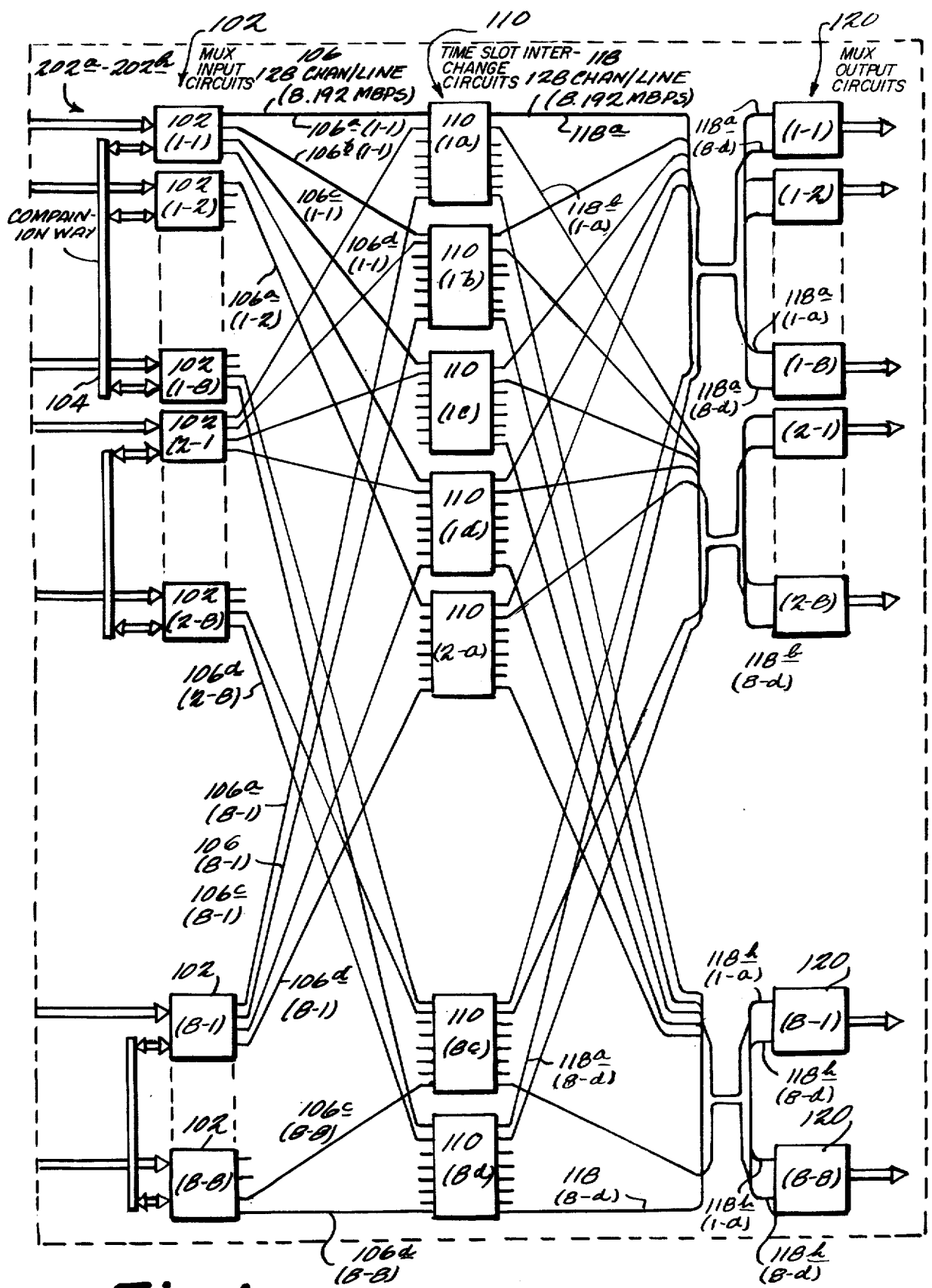
FIG. 1 is a block diagram of the switching matrix in accordance with the present invention.

A switching matrix 100 in accordance with the present invention is shown in FIG. 1. In the preferred embodiment, switching matrix 100 comprises a plurality of multiplexing input circuits 102, a plurality of time slot interchange circuits 110, 110(1a), 110(1b), . . . , 110(8d), and a plurality of demultiplexing output circuits 120.

Multiplexing input circuits 102 are arranged in groups of, for example, eight. The respective multiplexing input circuits 102 are denoted herein by the group number, followed by the relative position number of the particular multiplexing input circuit 102 within the group. Similarly, the association of a given element with a particular multiplexing input circuit 102 will be designated by a parenthetical indication of the group and relative position number of the particular multiplexing input circuit 102 with which the element is associated. For example, the second multiplexing input circuit 102 in the n-th group is denoted circuit 102(n-2), the multiplexing input circuits 102 of the first group are denoted 102(1-1) to 102(1-8) respectively, multiplexing input circuits 102 of the second group are denoted 102(2-1) to 102(2-8) respectively, and so forth. Each multiplexing input circuit 102 cooperates with eight input lines through associated input ports, and is interconnected with each of the other multiplexing input circuits 102 within the group by a 16 line companion-way bus 104. Each multiplexing input circuit 102 includes 4 output junctors (also referred to as inways) 106a, 106b, 106c and 106d.

Each input port of input circuit 102 is responsive to pulse-code modulation ("PCM") input data. The PCM data on each input line comprises time-division multiplexed samples from 32 channels. The data is suitably formatted having 32 channels per frame with 8 bits (1 byte) per channel and is applied to the input line at a bit rate of for example, 2.048 megabits per second.

The samples (8-bit data byte) from respective channels are, in effect, interleaved in time. The 8-bits of each data byte are serially applied to a common transmission medium (one input line to one of the multiplexing input circuits 102) during sequential time periods (time slots). The respective corresponding samples from each of the channels, as sequentially applied to the transmission line, together comprise a "frame" of data. Thus, each frame of data comprises a plurality of "time slots", each time slot associated with a particular channel identified by the relative position of the time slot within the frame. The duration of the time slots of the multiplexed PCM data will hereinafter sometimes be referred to as a "data byte time interval".

During each time slot, each multiplexing input circuit 102 of a particular group provides at any of its four output junctors 106a, 106b, 106c, 106d any data byte applied to any of the input ports of any multiplexing input circuit 102 of the group, during the particular time slot. Multiplexing input circuits 102 also provide an additional stage of time division multiplexing.

A sixteen line companionway 104 provides for communication between a given multiplexing input circuit 102 of a particular group and the other multiplexing input circuits 102 of the group. Two lines of the respective 16 lines of companionway 104 are associated with each multiplexing input circuit 102 of the group defined by the particular companionway 104.

Figure 2:
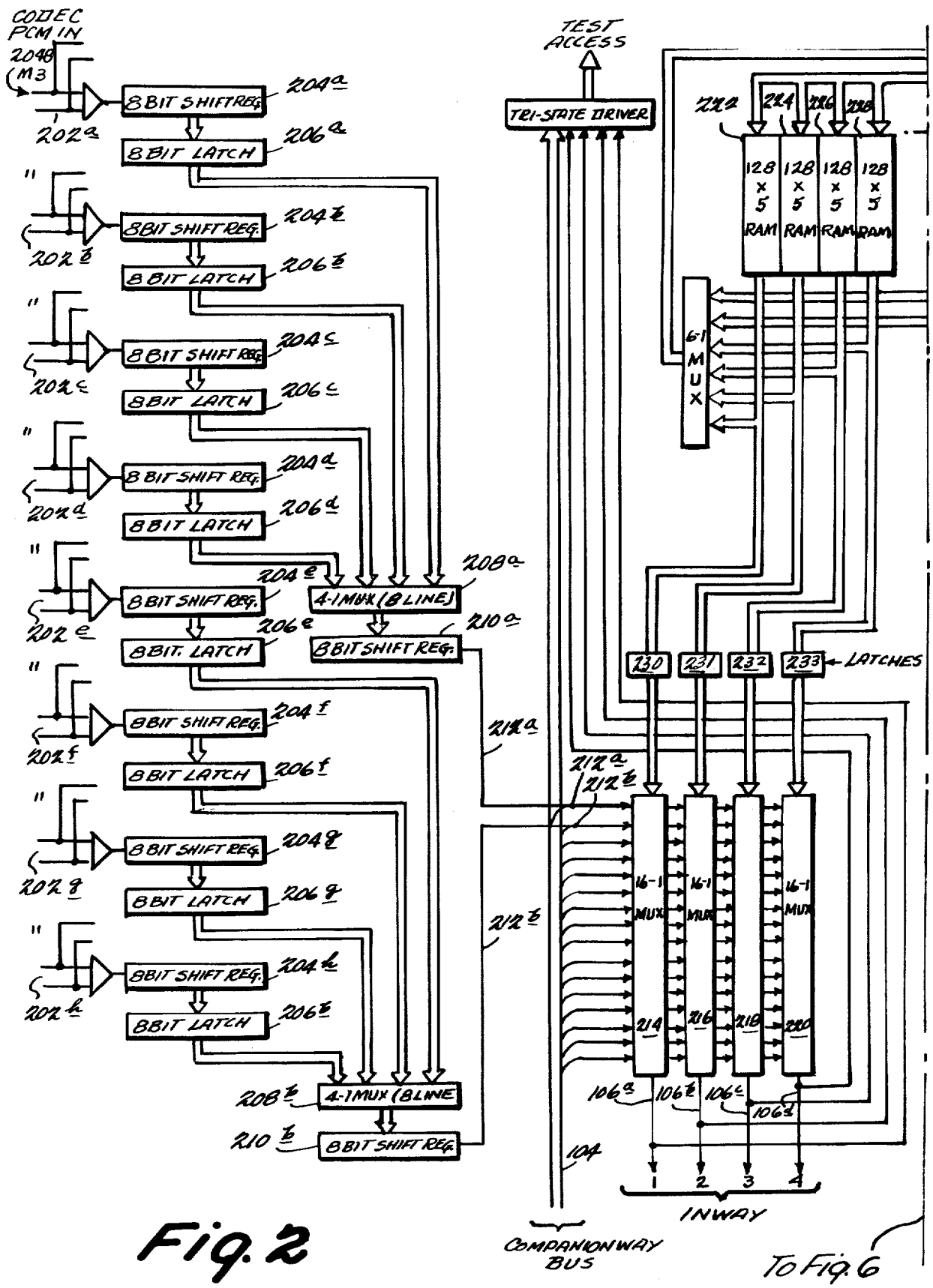
FIG. 2 is a block schematic of an exemplary multiplexing input circuit of the present invention.

As will be more fully explained in conjunction with FIGS. 2 and 3, the data on the 8 input ports of each multiplexing input circuit 102 is multiplexed by each multiplexing input circuit 102 onto the two associated lines of companionway 104, at a speed (8.102 Mb/s) four times the bit rate (2.048 Mb/s) of the input data. Input ports 1–4 of a particular multiplexing input circuit 102 are multiplexed onto one associated high speed PCM line of companionway 104 and input ports 5–8 are multiplexed onto the second associated high speed PCM line of companionway 104. Thus, each associated line of the companionway 104 contains four "time compressed" data bytes during each time slot. The "time compressed" frame thus comprises 128 time compressed time slots. The 16 lines of companionway 104 are applied to the inputs of each of four 16-to-1 multiplexing stages in each of the multiplexing input circuits 102 within the group, to provide output data streams on junctors 106a–106d. The output data stream on each of the junctors 106a–106d during a given compressed time slot contains data bytes selected from any of the data bytes on companionway 104 by any of the multiplexing input circuits 102 in the group during the compressed time slot. Thus each inway (output junctor) 106 provides a data frame of samples from 128 channels occurring during respective time compressed time slots associated with those 128 channels.

The output junctors 106a, 106b, 106c and 106d of each multiplexing input circuit 102 are coupled to respective substantially identical time slot interchange TSI circuits 110. TSI circuits 110 will be more fully described in conjunction with FIGS. 4 and 5. Each corresponding junctor 106 from each corresponding multiplexing input circuit 102 of each group are connected to respective input terminals of an associated TSI circuit 110. More particularly, junctors 106a(x-y), 106b(x-y), 106c(x-y) and 106d(x-y) (where x=1,2 . . . 8, y=1,2 . . . 8), are connected to the respective input terminals of TSI circuits 110(y-a), 110(y-b), 110(y-c) and 110(y-d) respectively. For example, the 106a junctors from the first multiplexing input circuit 102 of each group, i.e., 106a(x-1), (where x=1,2 . . . 8) are connected to the respective input terminals of TSI circuts 110a(1-a). The junctors 106b(x-1), 106c(x-1), and 106d(x-1) are conneted to the respective input terminals of TSI circuits 110(1-b), 110(1-c) and 110(1-d) respectively. Likewise junctors 106a(x-2), 106b(x-2), 106c(x-2) and 106d(x-2) are connected to the respective input terminals of TSI circuits 110(2-a), 110(2-b), 110(2-c) and 110(2-d) respectively, and so forth. Each TSI circuit 110 includes a number of output signal lines, outways 118a–118h, equal to the number of input terminals. During sequential compressed time slots, each TSI circuit 110 provides independently on each outway 118a–118h, 8-bit data bytes, controllably selected from any of the data bytes applied to the TSI circuit 110 during the frame of data. The TSI circuit 110 thus restructures the relative positional (time) relationships of the data bytes applied to the TSI circuit inputs.

The corresponding outways 118 from each of the TSI circuits 110 are connected to the respective corresponding inputs of each of a group of eight demultiplexing output circuits 120. Demultiplexing output circuits 120 are designated in a manner similar to the designation of input circuits 102. For example, each outway 118a is connected to one input port of each of a first group of demultiplexing output circuits 120(1-1)–120(1-8). The outway 118a of TSI circuit 110(1-a) (outway 118a(1-a)) is connected to one input port of each of output circuits 120(1-1)–120(1-8), outway 118a of TSI circuit 110(1-b) (i.e. 118a(1-b) is connected to corresponding second input port of each of output circuits 120(1-1)–120(1-8), outway 118a(1-c) is connected to corresponding third input ports of each of output circuits 120(1-1)–120(1-8), and so forth. The 118b–118h outways of TSI circuits 110 are connected to the input ports of respective groups of output circuits 120 in a like fashion.

Demuliplexing output circuits 120, in effect, controllably route the time slot interchanged data from the TSI circuits 110 to appropriate output channels and restore the data to the input data bit rate to complete the effective connection between designated channels. Demultiplexing output circuits 120 will be hereinafter more fully described in conjunction with FIG. 6.

An exemplary multiplexing input circuit 102 will be described. Multiplexing input circuit 102(1-1) is shown in FIG. 2. The other input circuits 102 are identical excepting the input and output connections as described in connection with FIG. 1. Referencing now to FIG. 2, multiplexing input circuit 102 provides time compression-time division multiplexing of the PCM data on the input ports thereof (202a–202h) onto the two lines (212a, 212b) of companionway 104 associated with the particular input circuit 102. Input circuit 102 includes a plurality of serial input/parallel output shift registers (204a–204h), one associated with each input port (202a–202h). A respective 8-bit latch 206a–206h is coupled to the parallel output terminals of each of shift registers 204a–204h. Shift registers (204a–204h) and latches (206a–206h) are suitable commercially available circuits such as 74LS164(TYP) and 74LS374(TYP) chips.

Shift registers 204 and latches 206 perform a serial to 8-bit parallel conversion of the PCM data. Shift registers 204 are clocked at the input data bit rate to serially shift each 8-bit data byte of the PCM input into the shift register 204. Upon the shifting of the eighth bit of the data byte into the shift registers 204, the contents of the shift registers 204 (the data byte) are latched into the corresponding latches 206. The data byte is maintained in latch 206 until the next data byte is completely shifted into shift register 204.

The respective data bytes applied to input ports 202a–202d and 202e–202h during each input data time slot are provided on companionway lines 212a and 212b, respectively, in a time compressed accelerated bit rate-time division multiplexed serial form. Each latch 206a–206d is coupled in sequence to an eight bit parallel-in serial-out shift register 210a. Similarly, latches 206e–206h are coupled in sequence to an eight-bit parallel-in, serial-out shift register 210b. Shift registers 210a and 210b are any suitable commercially available circuits such as a 74LS166(TYP). The sequential application of the data bytes from latches 206 to shift registers 210 is suitably effected by respective 8-line 4 to 1 multiplexers 208a and 208b, or by respective appropriately controlled data buses. Shift registers 210a and 210b are clocked at a rate at least 4 times the data input bit rate to provide for time compression. The individual bits of the data bytes are thus serially output onto lines 212a and 212b at a rate at least four times the input data bit rate. As previously noted in the preferred embodiment, the input data bit rate is 2.048 Mb/s and the time compressed companionway/junctor/outway bit rate is equal to 8.192 Mb/s. The sequential application of the respective data bytes from latches 206 to shift registers 210 is timed accordingly. Thus, during one input data byte time interval, each of the four corresponding input data bytes applied at input ports 202a–202d are sequentially provided at an accelerated (time compressed) rate on companionway line 212a and the four corresponding input data bytes applied at input ports 202e–202h are similarly provided on companionway line 212b.

Multiplexing input circuits 102 also provide "space switching" of the time compressed data on respective companionway lines onto the four output junctors (inways) 106a–106d of the multiplexing input circuit 102. Each of the 16 companionway lines (includes lines 212a and 212b) is connected to the respective input terminals of each of four 16 to 1 multiplexers 214, 216, 218 and 220. The output terminals of multiplexers 214, 216, 218 and 220 are connected to junctors (inways) 106a, 106b, 106c, and 106d, respectively. The 16-to-1 multiplexers 214, 216, 218 and 220 are any suitable commercially available circuits such as a 74LS251(TYP).

Multiplexers 214, 216, 218 and 220 are respectively controlled by random access memories (RAMs) 222, 224, 226 and 228. Rams 222, 224, 226 and 228 are suitably commercially available 2101A(TYP) chips. RAMs 222, 224, 226 and 228 each have at least one memory location associated with each of the 128 compressed time slots in a data frame. The memory size thus accomodates control of a complete frame of 32 input data time slots (128 compressed time slots). RAMS 222, 224, 226 and 228 and associated elements operate independently in an identical manner to provide independent signals on junctors 106a, 106b, 106c and 106d. For the sake of clarity, only the operation of RAM 222 and the elements associated therewith will be discussed, it being recognized that the discussion applies equally well to RAMS 224, 226 and 228 and their respective associated elements.

Each location in RAM 222 is loaded with indicia of the particular data byte (or input channel) to be provided on the junctor by the associated multiplexer during the junctor time slot associated with the memory location. More particularly each RAM location is loaded with a code indicative of the particular line of companionway 104 bearing the data byte to be provided on the junctor during the junctor time slot associated with the RAM location. A four-bit code can be utilized for the purpose, if desired, and is accomodated in 128×4 RAMS. However, it is often desirable to explicity designate inactive status during a given junctor time slot. Accordingly, a 5-bit code is utilized in the preferred embodiment, accomodated in 128×5 RAMS. The contents of the RAM locations are sequentially applied as control signals to the associated multiplexer 214 through latch 230. The control signals to multiplexer 214 are changed at a rate equal to ⅛ the time compressed bit rate, i.e. for each junctor time slot, 128 times per frame.

The designation of the particular data bytes for each junctor time slot is effected by a switch management processor unit (not shown) in accordance with standard state of the art techniques. The switch management processor function is suitably performed by the telephone system central processing unit (CPU). See, for example, Martin, "Systems Analysis for Data Transmission", Prentice-Hall and Martin, "Telecommunications and the Computer", Prentice-Hall, 1969. RAMS 222, 224, 226 and 228 are interfaced to the telephone system central processing computer by suitably state of the art interfacing circuits 230. It should be appreciated that switch management and route mapping, etc. can be effected by a standard microprocessor as alternative to, or in conjunction with the telephone system CPU. The appropriate codes are loaded into RAMS 222, 224, 226 and 228 by the telephone system CPU in accordance with the particular effective connections to be established by the switching matrix. The telephone system CPU also effects updating of the codes stored in the RAM location.

The operation of one group (Group 1) of multiplexing input circuits 102 is illustrated in FIG. 3. For the sake of clarity, the one input data time slot offset between input data and the signal on the junctors due to the serial to parallel conversion of the data will be ignored in the following discussion. Such offset is typically compensated for by the telephone system CPU.

For each data time slot, each of companionway lines 212a and 212b of the multiplexing input circuits 102(1-1) to 102(1-8) provides during sequential compressed time slots (A, B, C, D) selected data bytes from the four input ports associated with the particular companionway line. Specifically during compressed time slots A, B, C and D, each multiplexing input circuit 102(1-y) (y=1,2 ... 8) provides on its associated companionway line 212a(1-y) the data bytes from input ports 202a(1-y), 202b(1-y), 202c(1-y) and 202d(1-y) respectively. During compressed time slots A, B, C, and D multiplexing input circuit 102(1-y) also provides on companionway line 212b(1-y), the data bytes from input ports 202e(1-y), 202f(1-y), 202g(1-y) and 202h(1-y), respectively.

Multiplexers 214, 216, 218 and 220 in each of the multiplexing input circuits 102 in the group under control of RAMS 222, 224, 226 and 228 choose one of the data bytes applied to the multiplexer during that time compressed time slot. More particularly, during the compressed time slot A, the data bytes provided on junctors 106 are chosen from the data bytes applied to any of input ports 202a(1-y) or 202e(1-y) (y=1,2 ... 8). Similarly, during compressed time slots B, C, and D the data bytes provided on junctors 106 are chosen from the inputs data bytes applied to any of input ports 202b(1-y) or 202f(1-y), 202c(1-y) or 202g(1-y) and 202d(1-y) or 202h(1-y), respectively, where y=1,2 ... 8. In the example of FIG. 3, during the junctor time slot A, junctor 106a(1-1) carries the data byte provided at input port 202e(1-6). Simularly, during the second (B), third (C) and fourth (D) junctor time slot, junctor 106a carries the data bytes provided at input port 202f(1-1), 202c(1-4) and 202d(1-1), respectively.

The chosen data byte (input port) on junctors 106 are not necessarily the same from input data time slot to input data time slot, as the associated control RAM (222, 224, 226, 228) can effect selection of input port 202e(1-6) during the first junctor time slot A, and chose a different input port from the available group 202a(1-y), 202e(1-y) (e.g. 202a(1-8)) during successive junctor time slot A. The sequence thus is dynamic and fully flexible throughout the course of the data frame. The selected sequence repeats on a frame-by-frame basis, unless updated (changed) by the telephone system CPU.

Figure 3A:
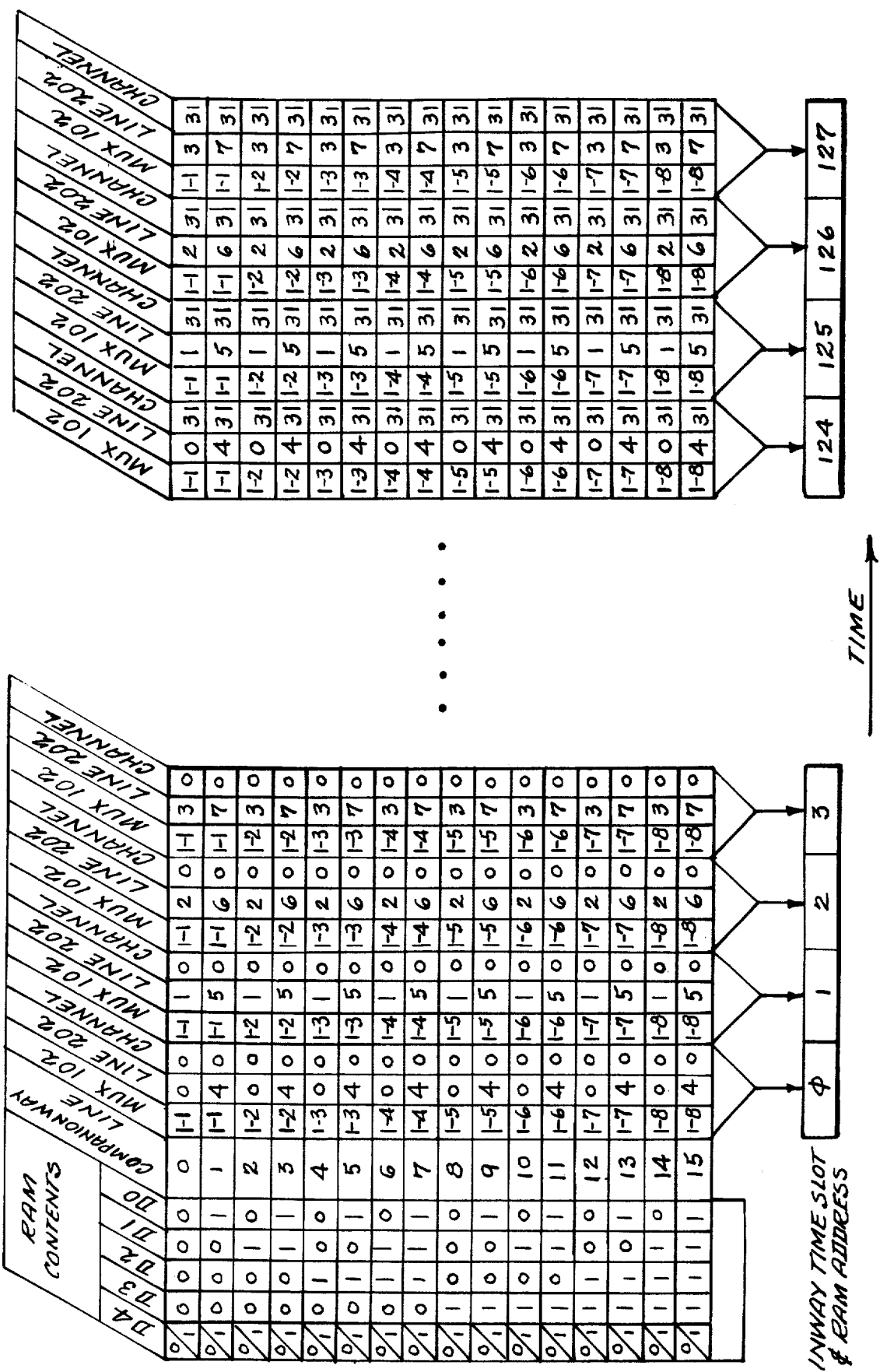

The operation of multiplexing input circuit 102 is diagrammatically illustrated in FIG. 3A. The particular multiplexing input circuit 102 line 202 and channel (compressed time slot) from which a data byte is taken during a given compressed time slot (0-127) is shown for each code entry in RAM 222. Input lines 202a-h are designated 0-7 in FIG. 3a. For example (ignoring the status D4 in RAM contents with the code 0,0,0,0 in the RAM 222 location corresponding to compressed time slot 0, the data byte provided at input line 0 (202a) of multiplexing input circuit 102(1-1) during the data time slot corresponding to channel 0 (in the first sampled channel) will be outputted on junctor 106a during compressed time slot 0. Alternatively, if code 1, 1, 1, 1 is loaded in the RAM location, the data byte from channel 0 of line 4 (202e) of multiplexing input circuit 102(1-8) will be outputted during compressed time slot 0. Similarly, if the code 1,1,1,1 were loaded in the RAM location corresponding to compressed time slot 127, the data byte from channel 31 of input line 7 (202h) to input circuit 102(1-8) will be outputted on junctor 106a during compressed time frame 127, and so forth.

Figure 4A:
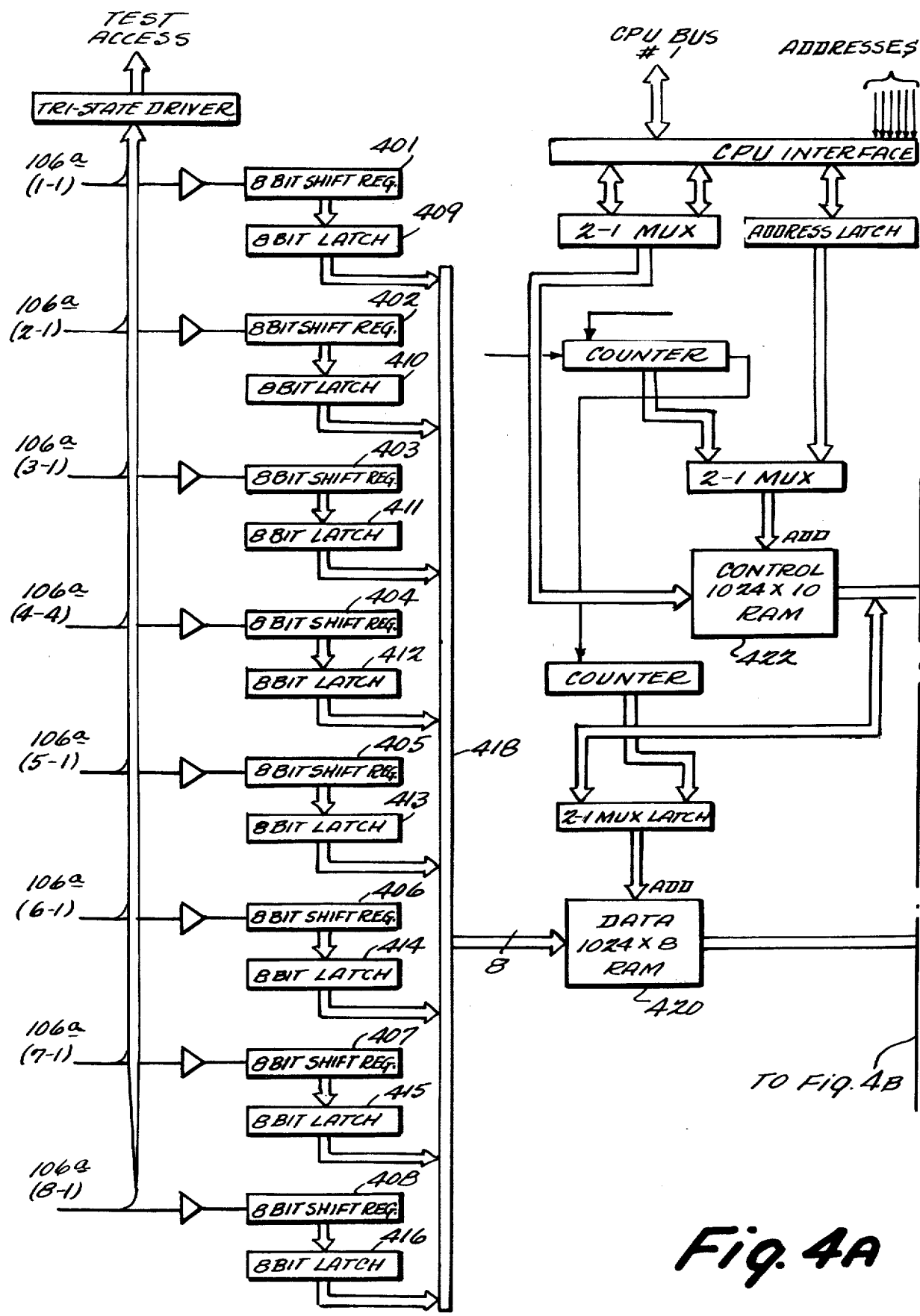
FIGS. 4a and 4b is a block schematic of a representative time slot interchanger of the present invention.
Figure 4B:
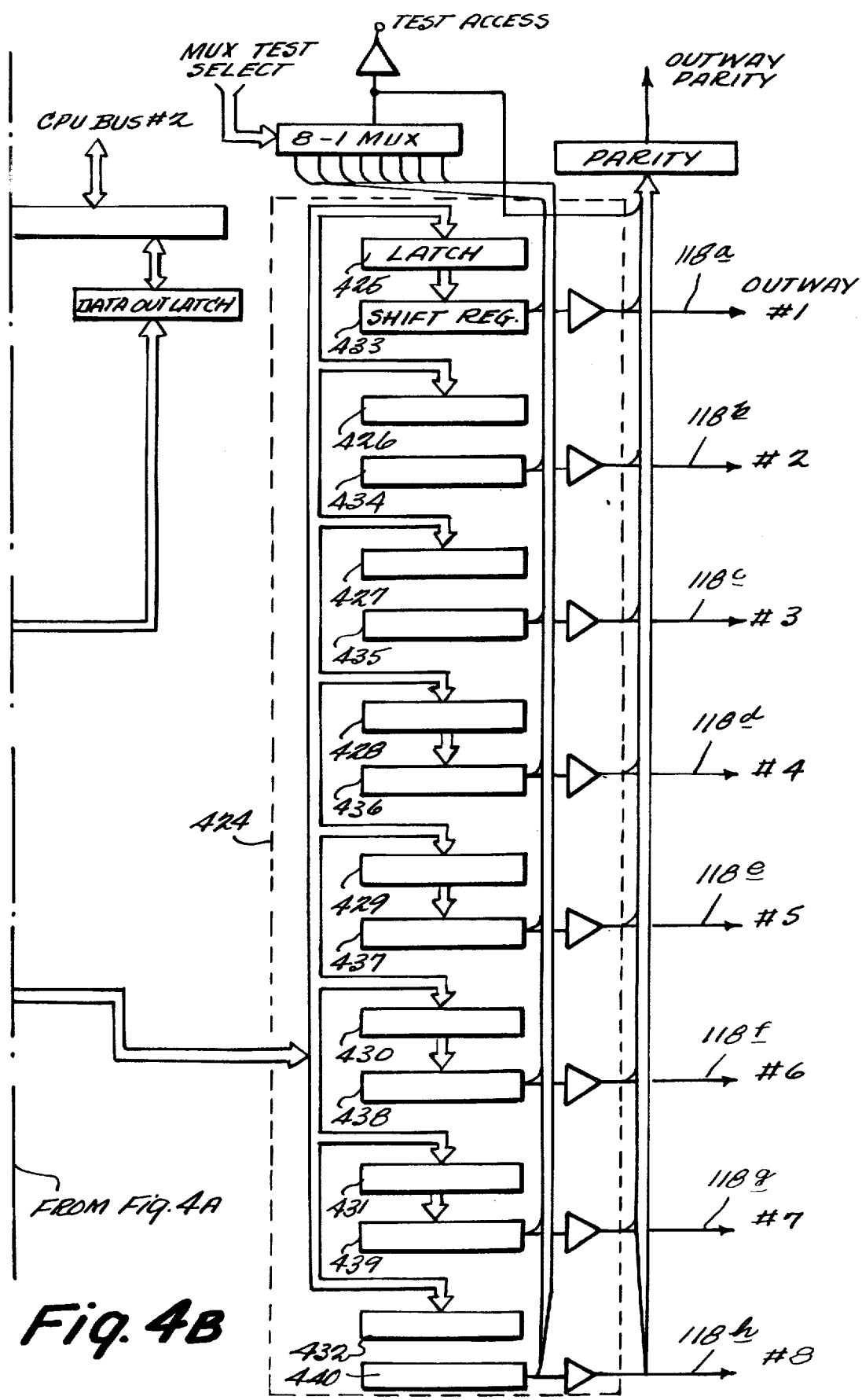

TSI circuits 110 will now be discussed in greater detail. TSI circuit 110(1-a) is shown in FIG. 4. The other TSI circuits are identical excepting the respective input and output connections, as previously described in conjunction with FIG. 1.

Each data byte as received is converted into parallel form. With reference to FIG. 4, junctors 106a(x-1), i.e. the junctors 206a from the respective first multiplexing input circuit of each group 102(1-1), 102(2-1), ..., 102(8-1) are coupled to respective 8-bit shift registers 401-408. The parallel outputs of shift registers 401-408 are applied to respective 8-bit latches 409-416. The contents of the respective shift registers are loaded into latches 409-416 after the full byte has been accumulated. The outputs of the latches are selectively gated onto a 3-state bus 418 for application to a 1024 by 8 random access memory (RAM) 420 (hereinafter sometimes referred to as "Data Ram" 420). The respective 8-bit shift registers 401-408 are any suitable commercially available circuit such as a 74LS104(TYP), while the respective 8-bit latches 409-416 are any suitable commercially available circuit such as a 74LS374(TYP).

Each of the data bytes in a full frame are stored in data RAM 420. The ram 420 is any suitable commercially availble circuit such as a 2125(TYP). Data RAM 420 includes at least one memory location for each data frame by each of the eight junctors providing inputs thereto. The contents of latches 409-416 are loaded into sequential locations in RAM 420. Thus, the eight data bytes applied during a first compressed time slot are loaded into a first block of eight locations. The data bytes on the respective junctors 106a during the next compressed time slot are, in effect, loaded into the next block of eight memory locations in RAM 420, and so forth.

The respective stored data bytes in data RAM 420 are read out in desired time-slot-interchanged order onto respective output lines (outways) 118a-118h of the TSI circuit 110 in accordance with control signals from a 1024-by-10 control RAM 422. While the sequential address locations of data RAM 420 are dedicated to particular channels as identified by junctors (inways) and compressed time slots, the respective sequential address locations of control RAM 422 correspond directly to particular channels as identified by outways (output lines) and compressed time slots. The address of the desired data byte in data RAM 420 is stored in the control RAM location corresponding to a specific outway 118 and compressed time slot. Control RAM 422 then accesses the contents of RAM 420 in sequence defined by the contents of the respective locations in the control RAM 422. The RAM 422 is any suitable commercially available circuit such as a 2125(TYP).

The time slot interchanged output of data RAM 420 is applied to a demultiplexer/parallel-to-serial converter 424 comprising 8 latches (425-432) and associated parallel-in serial-out shift register (433-440). Latches 425-432 selectively receive the output bytes from RAM 420. Latches 425-432 are activated in sequence to receive the respective successive data bytes to be outputted on the respective outways 118a118h during a given compressed time slot. Control signals to latches 425-432 are switchably generated by a counter decoder (not shown) clocked at the compressed bit rate. Shift registers 433-440 are associated with respective output lines 118a-118h.

The contents of the 8 locations of data RAM 420, identified by control RAM 422 and corresponding to the eight outways during a given "outway" time slot, are loaded into the respective corresponding latches of serial-to-parallel converter 424. After the loading of the latches is completed, the contents of the latches are applied to the associated shift registers 433-440. Shift registers 433-440 then concurrently output the data bytes onto the respective outways in serial form, during the outway (compressed) time slot. While shift registers 433-440 are generating a serial output onto the outways 118, latches 425-434 collect the data bytes for the next successive outway time slot. The respective shift registers 433-440 are any suitable commercially available circuit such as a 74LS166(TYP), while the respective latches 425-432 are any suitable commercially available circuit such as a 74LS273(TYP).

An exemplary output signal format for outway 118a is shown in FIG. 5. As shown in the figure, the output on outway 118a may be any one of the data bytes applied to the TSI circuit 110(1-a). Similarly, the data stream provided on outway 118b may be any one of the data bytes applied to the TSI circuit 110(1-a), but is otherwise unrelated to the signal provided on outway 118a.

Figure 6:
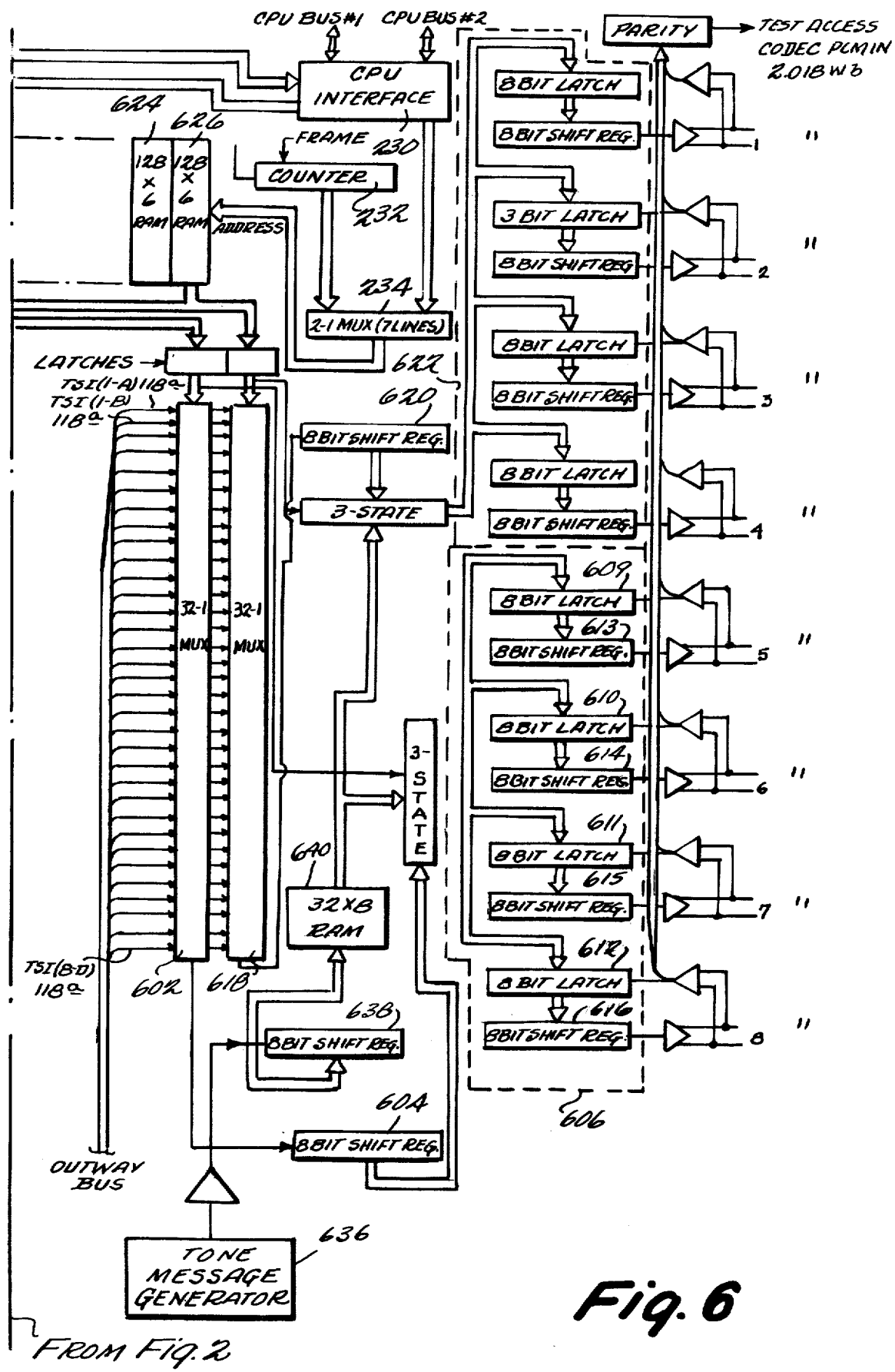
FIG. 6 is a block schematic of a representative demultiplexing output circuit of the present invention.

A representative demultiplexing output circuit 120 is now discussed in greater detail. Demultiplexing output circuit 120(1-1) is shown in FIG. 6. The other demultiplexing output circuits 120 are identical to demultiplexing output circuit 120(1-1) except with respect to input and output connections as previously discussed in conjunction with FIG. 1. With reference to FIG. 6, the 32 outways 118a providing inputs to demultiplexing output circuit 120(1-1) are applied to the respective input terminal of a 32-to-1 demultiplexer 602. The output of demultiplexer 602 is applied to an 8-bit serial-in parallel-out shift register 604. The parallel output of shift register 604 is applied to a 1-to-4 demultiplexer/parallel-to serial converter 606 comprising a "3-state bus" 608 (a gated 4 to 1 demultiplexer), four 8-bit latches 609, 610, 611 and 612, and four 8-bit parallel-in serial-out shift registers 613, 614, 615 and 616, respective associated with latches 609-612. The 3-state bus 608, as will be explained, loads each of latches 609-612, in sequence, with successive data bytes applied to the 3-state bus. Latches 609-612 provide the data to the associated parallel-in, serial-out shift register 613-616. Each shift register 613-616 is clocked at the input data rate (as opposed to the time compressed rate) to provide PCM data on an associated PCM output line.

The 32 outways 118a are also connected to the respective input terminals of a second 32 to 1 demultiplexer 618. Demultiplexer 618 cooperates with an 8-bit shift register 620 and a 1-to-4 demultiplexer/parallel to serial converter 622. Demultiplexer 618, shift register 620 and demultiplexer 622 are interconnected and operate in a manner identical to that of demultiplexer 602, shift register 604, and demultiplexer 606.

The respective 32-to-1 demultiplexers 602 and 618 are commercially available circuits such as a 74LS251(TYP). The respective 8-bit shift register 604 and 620 are commercially available circuits such as a 74LS164(TYP). The respective latches 609-612 are commercially available circuits such as a 74LS374(TYP), and the respective shift registers 613 and 616 also are commercially available circuits such as a 74LS166(TYP).

Demultiplexers 602 and 618 operate under the command of 128-by-6 control RAMs 624 and 626, respectively. RAMS 624, demultiplexer 602, shift register 604 and demultiplexer/parallel to serial converter 606 are associated with 4 of eight PCM output lines of demultiplexing output circuit 120, and operate in parallel with RAM 626, demultiplexer 618, shift register 620 and demultiplexer/parallel to serial converter 622, which are associated with the remaining four PCM output lines. For the sake of clarity, only the operation of RAM 624 and the elements associated therewith will be discussed, it being recognized that the discussion is also applicable to RAM 626 and associated elements.

Control RAM 624 communicates with the telephone system central computer through CPU interface 230. Control RAM 624 includes for each of the particular four PCM output lines associated therewith at least one memory location corresponding to each channel (time slot) on the line. Each respective location is loaded by the telephone system CPU through CPU interface 230 with the indicia of the particular outway line 118a to be selected by the associated multiplexer 602.

The memory locations in control RAM 624 are suitably divided into nominal blocks of four; the locations in each particular block corresponding to the respective four output lines associated with the particular control RAM during a given data time slot. The control RAM 624 memory assignments thus correspond to the compressed frame. The control RAM 624 memory locations are therefore sequentially accessed in synchronism with each frame under control, for example, of a counter 232, to provide control signals to demultiplexers 602. Counter 232 and CPU interface 230 are selectively coupled to the address inputs of RAMS 624 through a 7-line 2-1 multiplexer 234.

Accordingly, during each compressed time slot, one data byte is selected from any of the data bytes provided by any one of outways 118 during the time slot in accordance with the contents of the RAM 624 location corresponding to a particular output line. The chosen data bytes are provided at the output of associated demultiplexer 602 and are serially applied at a rate four times the input data rate to shift register 604. When a data byte is accumulated in the shift register, it is applied in parallel through 3-state bus 608 to a respective 8-bit latch 609-612. Each latch 609-612 selectively receives the data byte corresponding to the particular output line associated therewith. More particularly, latch control signals in synchronism with the time compressed data frame are generated to latches 609-612 in succession so that the latches are respectively loaded with the four successive data bytes in the time compressed data frame associated with a particular input data time slot. The latch control signals may be generated by a counter or shift register (not shown) clocked at the time compressed bit rate. The data bytes are thereafter loaded into a respective 8-bit shift register 613-616. Shift register 613-616 are clocked at the input data rate to serially output the data byte at a rate equal to the input data rate.

Figure 7:
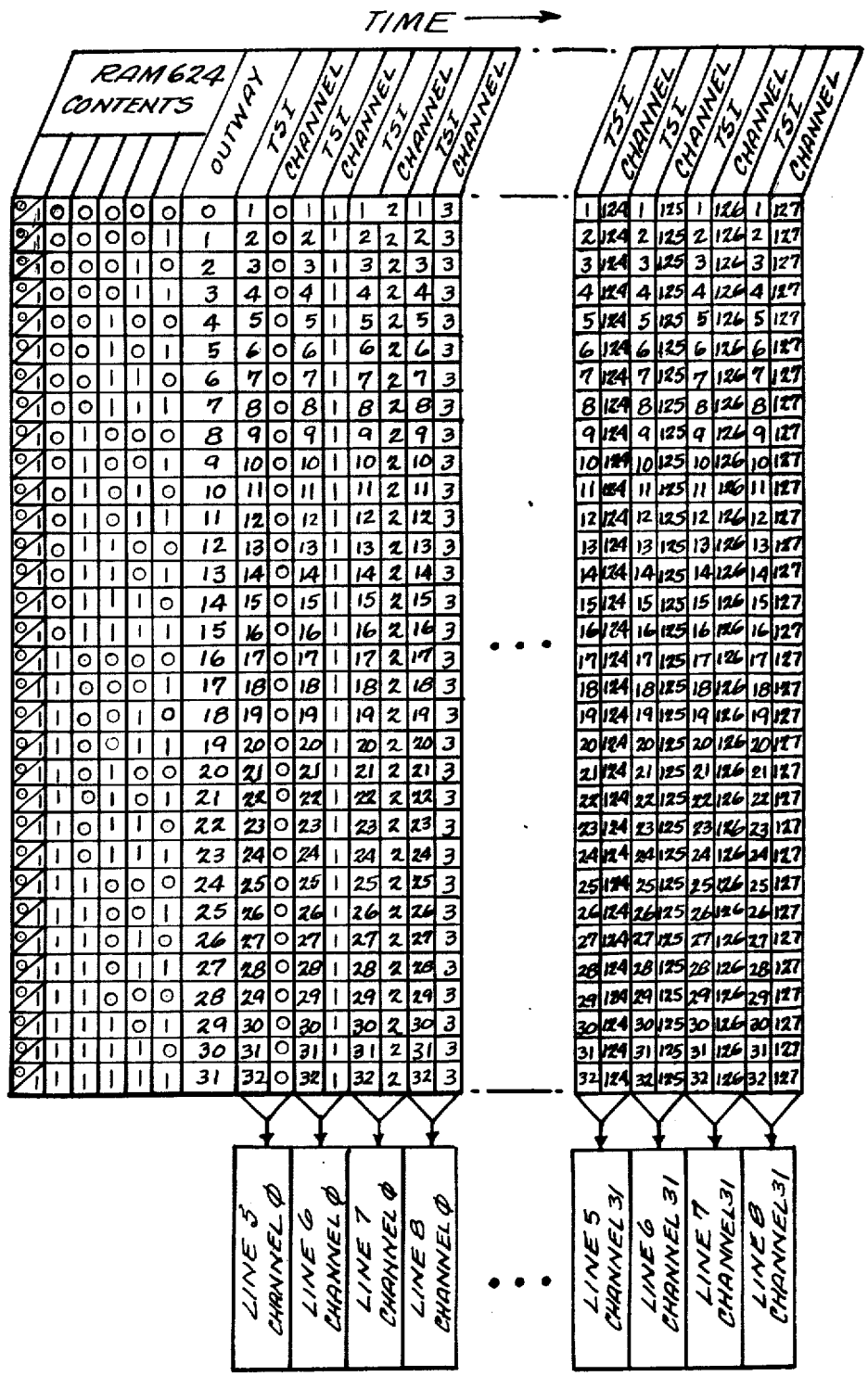
FIG. 7 is a chart illustrating the operation of the demultiplexing output circuit of FIG. 6.

The operation of demultiplexing output circuit 120 is illustrated diagramatically in FIG. 7. FIG. 7 shows the particular TSI circuit 110 from which the outway 118a originates, and the channel (compressed time slot) on the outway 118a providing the data byte to be outputted in response to each control code in RAM 624. TSI circuits 110(1-a)-110(8-d) are designated in FIG. 7 as 1-32. For example the code 0,0,0,0,0 loaded into the location of RAM 624 corresponding to line 5, channel (data time slot) 0 will cause the data byte provided on outway 118a from TSI 1 (i.e. TSI circuit 110(1-a) during compressed time slot 0 to be outputted on line 5 during the data time slot corresponding to channel 0. Similarly, the code 0,1,0,0,1 in the RAM 624 location corresponding to line 7, channel 0 will provide on line 7 during the data time slot corresponding to channel 0 the data byte present on the outway 118a from TSI 10 (i.e. TSI circuit 110(3-b)) during compressed time slot 2, and so forth.

The demultiplexing output circuit 120 also includes provisions for generating auxiliary tones or messages to the respective output lines and channels. Completely non-blocking access to up to 32 tones is provided without the necessity of mapping a route through the switching matrix. The type of tones or messages which can be provided include the busy signal, dial tone, and audible ring tone utilized in modern telephone systems. Digital representation of the tones or messages are generated by a suitable tone message generator 636. The respective bytes of the digital representations of the messages are serially applied to an 8-bit shift register 638. The parallel outputs of shift register 638 are coupled to the data inputs of 32-by-8 RAM 640. As 8-bit bytes representing the respective message tones are accumulated by shift register 638, they are loaded into consecutive locations in RAM 640. Each location of RAM 640 thus contains a data byte representation of a respective message tone which is updated during the course of each data frame. The location of RAM 640 corresponding to the particular desired message/tone is addressed by control RAM 624 and control RAM 626 for the application of tone/message information to demultiplexer 606 and 622. The selection between an effective connection through demultiplexer 602 or a message tone from RAM 622 is effected through a status bit in the data supplied to control RAM 624 and 626.

Again, for the sake of simplicity, only the cooperation between the message tone system, RAM 624 and elements associated with RAM 624 will be discussed. The message tone system cooperates in an identical manner with RAM 626 and the elements associated therewith.

The state of most significant bit of control code stored in RAM 624 suitably distinguishes between demultiplexer and message RAM control codes. When this status bit is high, the control code would be in an illegal range for demultiplexers 602. The status bit of the control code is applied as a control signal to 3-state bus 608, to selectively apply either the signals from shift register 604, or the signals from RAM 640 to the appropriate one of latches 609–612. Thus, the message tone from RAM 640 is output on a designated line during the appropriate data time slot.

A minimum configuration including a single multiplexing input circuit 102 (multiplexing input circuit 102(1-1)), four time slot interchangers (110(1-1) to 110(1-4)) and one demultiplexing output circuit 120 (demultiplexing output circuit 120 (1-1)) is capable of handling 256 channels (eight 32-channel lines). It should be appreciated that the system can be readily expanded to a capability of 16,384 channels without requiring reconfiguration of the preferred hardware embodiments disclosed herein. Seven additional multiplexing input circuits 102 (multiplexing input circuits 102(2-1), 102(3-1) ... ,102(8-1)) and seven additional demultiplexing output circuits 120 (demultiplexing output circuits 120(2-1), ... 120(8-1)) can be added to expand the system capability to 2,048 channels without requiring addition of additional TSI circuits. The system capability can then be further expanded in steps to the maximum capability of 16,384 channels (for the configuration of FIG. 1) by adding groups of multiplexing input circuits 102, TSI circuits 110 and demultiplexing output circuits 120 to the system. For example, the next step of system expansion from 2,048 channels would be implemented by adding eight multiplexing input circuits (102(1-2)–102(8-2)) and demultiplexing output circuits (120(1-2)–120(8-2)) to the system in conjunction with an additional stage of four time slot interchanger units (TSI 110(2-a)–110(2-d)). Additional expansion as needed can then be effected by addition of a further group of eight multiplexing input circuits (102(1-3)–102(8-3)), four TSI circuits (110(3-a)–110(3-d)), and eight demultiplexing output circuits (120(1-3)–120(8-3)), and so forth. The number of groups that can be accommodated is dictated by the number of input and output ports of the time slot interchanger. In the preferred embodiment, an 8-input-/output time slot interchanger is used. The system can, of course, be made compatible with larger groups of input and output multiplexers by utilizing time slot interchangers having additional input/output ports.

A fully non-blocking matrix in accordance with the known CLos 2N−1 criteria is provided by any of the above defined expansion configurations.

Figure 8:
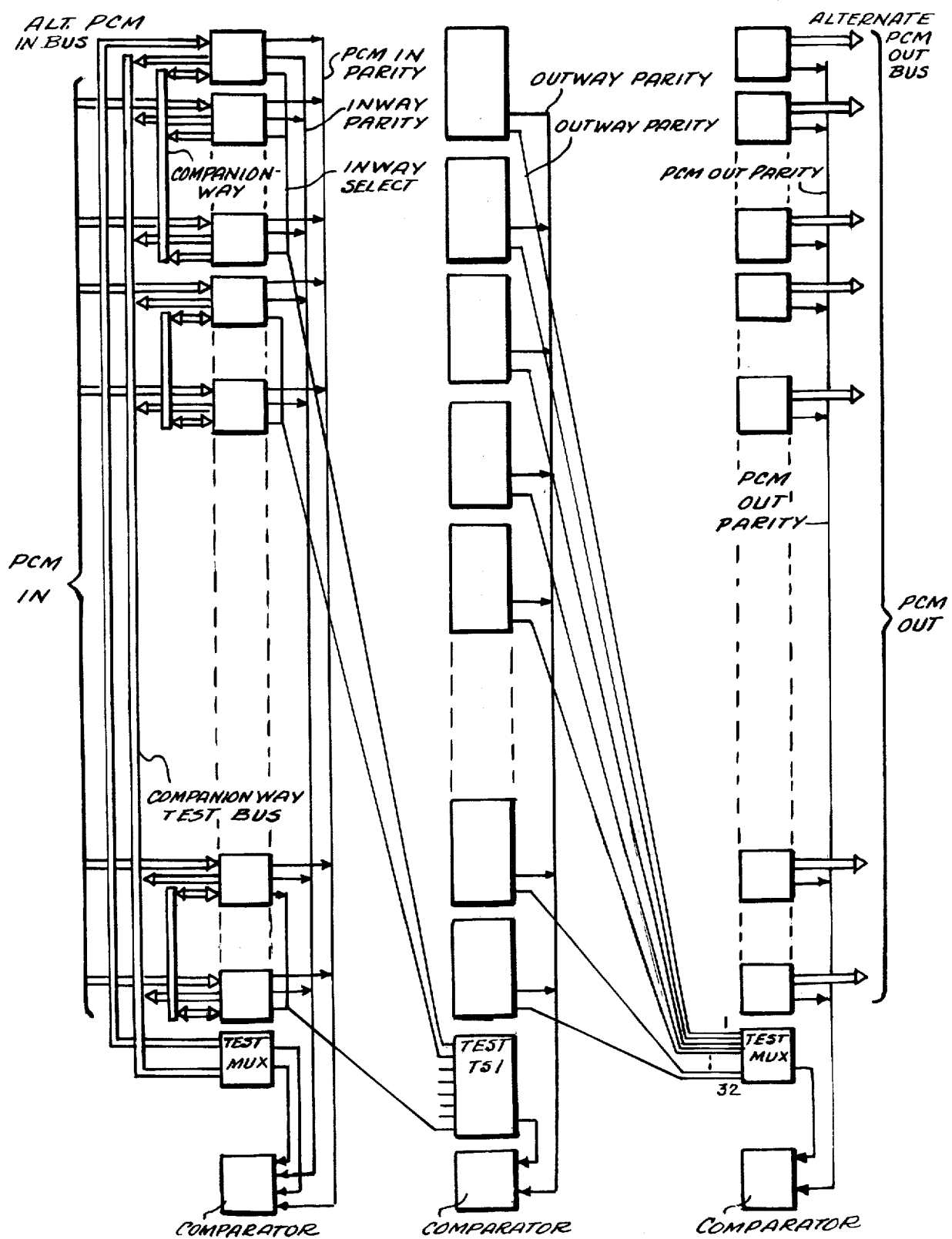
FIG. 8 is a block diagram of a testing scheme for the present invention.

Additionally, a test feature is provided whereby the operation of each multiplexing input circuit, demultiplexing output circuit, and time slot interchanger can be verified. The inputs to each multiplexing input circuit are selectively applied to an identical (redundant) test multiplexing input circuit under control of the system CPU (or switching management microprocessor). PCM-in parity and inway parity of the system multiplexing input circuit is then compared to the PCM-in parity and inway parity of the test unit. If the respective parities do not favorably compare, indicia of malfunction is provided. Similarly, each TSI is tested against a redundant test TSI and each demultiplexing output circuit is tested against a redundant test demultiplexing output circuit. If a component failure is detected, a redundant component may be utilized in the system operation until the defective component is replaced. The change in role of the redundant component is effected by the switch management processor (system CPU or microprocessor). The testing scheme is diagrammatically illustrated in FIG. 8.

It should be appreciated that the digital switching system described herein is particularly advantageous. The modular building block architecture of the system permits a cost effective switch over a size range from a few hundred to 16,384 channels. System growth is accomplished without requiring reconfiguration of the existing system. The system is expanded merely by adding additional circuit board modules and cables. Further, the system provides a non-blocking switching matrix in any size configuration, guaranteeing that any channel may be effectively connected to any other channel without re-routing existing effective connections through the matrix. Further, the space-time space-architecture minimizes port to port delay and simplifies the algorithm for mapsearch and connections performed by the switch management processor (microprocessor or system CPU). Further, the time compression/time division multiplexing performed by multiplexing input circuits 102 and expansion-demultiplexing performed by demultiplexing output circuits 120, minimize interconnections and result in an improved overall system reliability. Further the relatively simple configuration provides for minimization of floor space, and, additionally, is compatible with conventional telephone battery power backup systems. Further, module (component) replacement is performed without disruption of system operation through use of the redundant component testing scheme. Further, the digital switching system provides for 32 message tones, applied directly to the multiplexing output circuit 120, and accordingly eliminates blocking of the tones and the necessity for a map search to the matrix by the switching management processor. Thus, a significant reduction of processor time results. It will be understood that the above description is of illustrative embodiments of the present invention and that the invention is not limited to the specific forms shown. Modifications may be made in the design and arrangement of the elements without departing from the spirit of the invention as expressed in the appended claims.

What is claimed is:

1. A digital switching system for selectively effecting communication between respective designated ones of a plurality of information channels; said digital switching system operating on a plurality of input data lines and corresponding output data lines, each input data line and corresponding output data line having a respective group of channels associated therewith, said group of associated channels being time division multiplexed onto said associated input data line to provide on said associated input data line sequential bytes of binary data occurring in sequential time slots, each of said time slots being associated with a respective particular channel of said group of channels; said digital switching system selectively providing on said corresponding output data line sequential bytes of binary data occurring in sequential time slots associated with the respective particular channels of said associated group of channels, said digital switching system comprising:

multiplexing input circuit means, coupled to said plurality of input data lines; and having a plurality of companionway lines associated therewith, for time compressing the data bytes from said plurality of input data lines and time division multiplexing said time compressed data bytes onto said associated companionway lines to provide on said companionway lines sequential time compressed data bytes occurring during successive compressed time slots, said multiplexing input circuit means additionally having at least one inway junctor line associated therewith and further including means for selectively coupling designated ones of said companionway lines to said inway junctor line during respective compressed time slots;

time slot interchange means, coupled to said inway junctor line and having at least one outway junctor line associated therewith, for providing said time compressed data bytes on said associated outway junctor line in a controllable designated sequence different from the sequence of said time compressed data bytes on said inway junctor line; and demultiplexing output circuit means, coupled to said outway junctor, for time expanding said differently sequenced compressed data bytes and time demultiplexing said time expanded data bytes onto respective ones of said associated group of output data lines;

said output circuit means further including means for storing an indicia of at least one predeterined message; and means for designating said means for storing indicia as an alternative to designating one of said outway junctor lines, and for generating said predetermined message onto said output line.

2. A digital switching system for selectively effecting communication between respective designated ones of a plurality of information channels, said digital switching system operating on a plurality of input data lines and corresponding output data lines, each said input data line and corresponding output data line having a respective group of channels associated therewith, said group of channels being time division multiplexed onto said associated input data line, providing on said associated input data line sequential bytes of binary data occurring in sequential time slots, each of said time slots being associated with a respective particular channel of said group of channels; said digital switching system selectively providing on said corresponding output data line sequential bytes of binary data occurring in sequential time slots associated with a respective particular channels of said group of channels, said digital switching system comprising:

multiplexing input circuit means coupled to said input data lines and having associated therewith a plurality of inway lines and a plurality of companionway lines, for time compressing said data bytes from said data lines, and for time division multiplexing time compressed data bytes from respective groups of said input data lines onto respective associated ones of said companionway lines, such that said time compressed data bytes are provided on said companionway lines during sequential time compressed time slots;

said multiplexing input circuit means further including means for designating, independently with respect to each of said inway lines, a respective one of said companionway lines during each of said compressed time slots, and means for selectively coupling during the compressed time slot the designated companionway lines to the respective inway lines, a plurality of time slot interchange means, each coupled to predetermined ones of said inway lines and having associated therewith at least one outway line, for controllably designating a reordered sequence of said time compressed data bytes and providing said time compressed data bytes on said associated outway line in accordance with said designated reordered sequence; and demultiplexing output circuit means, coupled to said plurality of time slot interchange means through said outway lines, for designating with respect to each compressed time slot a predetermined one of said outway lines, and time-demultiplexing and time-expanding the time compressed data bytes on said designated outway line onto said output data lines;

said demultiplexing output circuit means further including means for storing indicia of at least predetermined message; and means for designating said means for storing indicia as an alternative to designating one of said outway lines, and for generating said predetermined message onto said output data line.

3. A digital switching system for selectively effecting communication between respective designated ones of a plurality of channels, said digital switching system being adapted for cooperation with a plurality of input data lines and corresponding output data lines, each input data line and corresponding output data line being associted with a respective group of said channels, digital data bytes associated with each channel of the respective group of channels being combined on the associated input data line to form an input bit stream of sequential digital bits having a first bit rate ($r_1$), data bytes from the respective particular channels of the associated group of channels occurring in a predetermined order in the input bit stream during successive relative time slots to form successive frames of input data, each of said frames of input data comprising a respective input data byte from each of the respective particular channels of the associated group of chanels, and output data bytes associated with each of the particular channels of the associated group of channels being combined on said corresponding output data line to form an output bit stream of sequential digital bits having a second bit rate ($r_2$), output data bytes associated with the respective channels of the associated group of channels occurring in the output bit stream in a predetermined order during successive relative time slots to form successive frames of output data, each of said frames of output data comprising one output data byte associated with each of the respective channels of the associated group of channels, said digital switching system comprising:

a plurality of input circuits (IC's), each of said IC's having a plurality of IC input ports adapted for coupling to respective ones of said input data lines and a plurality of IC output terminals;

a plurality of companionway lines, at least one companionway line associated with each IC for defining a first predetermined number ($n_1$) of input circuit groups, each input circuit group comprising a second predetermined number ($n_2$) of IC's, each IC in the input circuit group being interconnected with the other IC's in the input circuit group by the companionway lines associated with the IC, the respective IC's in the Xth one of said input circuit groups being herein nominally designated as IC(X,1), IC(X,2)...IC(X,$n_2$), where X = 1,2...$n_1$;

each said IC in a given input circuit group including:

means for combining the input bit streams of a third predetermined number ($n_3$) of the input data lines coupled to that IC on the companionway line associated with the IC as a relatively high speed bit stream of sequential digital bits having a third bit rate ($r_3$), where $r_3$ is at least equal to the product of $n_3$ and $r_1$ ($r_3 \geq n_3 \times r_1$), successive sets of input data bytes occurring in corresponding time slots in the input bit streams of the respective $n_3$ input data lines occurring in the relatively high speed bit stream in sets of successive relative compressed time slots in a predetermined order to form successive frames of time compressed data, each of said frames of time compressed data comprising a respective time compressed input data byte from each channel of the respective groups of channels associated with respective $n_3$ input data lines coupled to the IC; and a fourth predetermined number ($n_4$) of multiplexer means, each associated with a respective one of the IC output terminals and responsive to respective control signals applied thereto, for providing at the associated IC output terminal, during each compressed time slot, a time compressed data byte selected, in accordance with said control signal, from the time compressed data bytes provided during the compressed time slot on any of the companionway lines associated with the IC's of the given input circuit group;

a fifth predetermined number ($n_5$) of time slot interchange (TSI) circuits each having at least said first predetermined number ($n_1$) of input terminals and at least said first predetermined number ($n_1$) of output terminals, said plurality of TSI circuits being herein nominally designated as TSI circuits (Y,Z), where Y = 1,2,3...$n_2$ and Z = 2,3...$n_4$, the input terminals of each TSI circuit (Y,Z) being respectively coupled to the Zth output terminal of each IC(X,Y) where X = 1, 2...$n_1$;

each said TSI circuit including:

means for controllably storing each time compressed data byte in a frame of time compressed data from each of the IC output terminals coupled to the TSI circuit, and for controllably generating during respective successive compressed time slots, signals indicative of selected ones of said stored data bytes in accordance with said respective designated ones of said plurality of channels to provide at each TSI output terminal a respective independent bit stream of sequential digital bits having a bit rate ($r_4$);

a plurality of output circuits (OC's) each having at least said fifth predeterined number ($n_5$) of OC input terminals and having at least said third predetermined number ($n_3$) of output ports adapted for coupling to respective ones of said output data lines;

means for coupling the OC input terminals to said TSI output terminals to define at least said first predetermined number ($n_1$) of output circuit groups, each output circuit group including at least said second predetermined number ($n_2$) of OC's, the respective output circuit groups being herein nominally designated respectively as output circuit group (X) where X = 1,2...$n_1$, the respective input terminals of each OC of each output circuit group (X) being respectively coupled to the Xth output terminal of each of said TSI circuits;

each said OC including:

at least one OC multiplexer means, having an output terminal and responsive to control signals applied thereto, for selectively providing the time compressed data byte from a designated one of the TSI output terminals, in accordance with said control signal, at said OC multiplexer means output terminal during each successive compressed time slot, means for generating said control signals to said OC multiplexer means in accordance with said respective designated ones of said plurality of channels to generate a bit stream at said OC multiplexer means output terminal comprising successive time compressed data bytes chosen during each compressed time slot from the time compressed data byte supplied during that compressed time slot on any of the TSI output terminals coupled to the output circuit;

a plurality of time expander means, one associated with each of said output ports, for receiving signals indicative of successive time compressed data bytes and generating on said associated output ports an output bit stream of sequential digital bits having said second bit rate ($r_2$), said output bit stream comprising successive output data bytes indicative of the successive time compressed data bytes applied to said time expander means; and means, responsive to the bit stream provided at said OC multiplexer means output terminal for generating signals indicative of the time compressed data bytes of that bit stream and applying said signals to the respective time expander means to controllably generate output bit streams at each output port.

4. A digital switching system for selectively effecting communication of data bytes between respective designated communicating channels of a plurality of channels; said digital switching system being adapted for cooperation with a plurality of input data lines and corresponding output data lines, each input data line and corresponding output data line being associated with a respective group of a first predetermined number ($n_1$) of said channels, data bytes from each channel of the group of $n_1$ channels being combined to form a bit stream on said associated input data line of sequential bits having a bit rate ($r_1$); said digital switching system providing on said corresponding output data line, data bytes to the channels of the group of $n_1$ channels, said data bytes being successively provided on said output data line during relative time slots respectively associated with the particular $n_1$ channels of the group to form a bit stream having a bit rate ($r_2$), said digital switching system comprising:

a plurality of input circuits (IC's) each comprising:

a plurality of IC input ports adapted for coupling to respective ones of said input data lines;

at least one companionway line defining an associated input circuit group, said companionway lines defining a second predetermined number ($n_2$) of input circuit groups, each of said input circuit groups having a third predetermined number ($n_3$) of IC's, said companionway lines interconnecting the respective input circuits in each of said input circuit groups to one another, the respective IC's of the Xth one of said input circuit groups being herein nominally designated as IC (X,1), IC(X,2) ... IC(X,$n_3$), wherein X=1,2 ... $n_2$;

a plurality of IC output terminals; at least one means for combining the bit streams of a fourth predetermined number ($n_4$) of the input data lines coupled to the IC on an associated companionway line as a relatively high speed bit stream having a bit rate $r_3$ at least equal to the product of $n_4$ and $r_1$, ($r_3 \geq n_4 \times r_1$), data bytes in corresponding time slots in the respective $n_4$ input data line bit s-reams occurring in the relatively high speed bit stream in a predetermined order in successive compressed time slots; and a fifth predetermined number ($n_5$) of first multiplexer means, each associated with a respective one of said IC output terminals and responsive to respective first control signals applied thereto in accordance with said designated communicating channels for providing during each compressed time slot at said associated IC output terminal a data byte selected in accordance with said first control signal from the data bytes provided during the compressed time slot on any of the companionway lines defining the associated input circuit group;

a sixth predetermined number ($n_6$) of time slot interchange (TSI) circuits, each of said TSI circuits having at least said second predetermined number $n_2$ of TSI input terminals and at least said second predetermined number $n_2$ of TSI output terminals;

said TSI circuits being herein respectively nominally designated as TSI circuit (Y,Z), where Y=1,2 ... $n_3$ and Z=1,2 ... $n_5$, the input terminals of each TSI circuit (Y,Z) being respectively coupled to the Zth output terminal of each IC(X,Y) where X=1,2 ... $n_2$;

each of said TSI circuits comprising:

a memory capable of storing a seventh predetermined number ($n_7$) of data bytes, said seventh predetermined number being at least equal to the product of said first predetermined number ($n_1$) times said fourth predetermined number ($n_4$) times said second predetermined number ($n_2$), ($n_7 \geq n_1 \times n_4 \times n_2$);

means for controllably storing data bytes applied at said TSI input terminals in said storage means; and means for controllably reading out said memory and generating at the TSI output terminals respective independent bit streams having a bit rate $r_4$, the bit streams at the TSI output terminals comprising successive selected data bytes occurring in an order in accordance with said designed communicating channels during successive compressed time slots;

a plurality of output circuits (OC's), each of said OC's comprising:

at least said sixth predetermined number $n_6$ of OC input terminals;

at least said fourth predetermined number $n_4$ of OC output ports, each of said output ports adapted for coupling with a respective output data line;

at least one OC multiplexer means, having at least one output terminal and responsive to respective second control signals in accordance with said designated communicating channels, for providing at said OC multiplexer means output terminal, a bit stream having said bit rate $r_4$, comprising successive data bytes occurring during successive compressed time slots, the data byte in a given compressed time slot being selected from the data bytes provided at any of the OC multiplexer means input terminals during the compressed time slot;

a plurality of data expander means, one associated with each output port, for receiving signals indicative of successive data bytes and generating therefrom a bit stream of sequential digital bits having said bit rate $r_2$; and means for generating signals indicative of the data bytes of the bit stream provided at the output terminals of said OC multiplexer means and selectively applying said signals to respective ones of said data expander means to provide at each of said OC output ports said output bit stream;

said system further comprising:

means for coupling the OC input terminals to said TSI output terminals to define at least said second predetermined number ($n_2$) of output circuit groups, each output circuit group including at least said third predetermined number ($n_3$) of OC's, the respective output circuit groups being herein nominally designated respectively as output circuit group (X) where X=1,2 ... $n_2$, the respective input terminals of each OC of each output circuit group (X) being respectively coupled to the Xth output terminal of each of said TSI circuits.

5. A digital switching system for selectively effecting communication of data bytes between respective designated communicating channels of a plurality of channels; said digital switching system adapted to cooperate with a plurality of input data lines and corresponding output data lines, each input data line and corresponding output data line having a group of a first predetermined number ($n_1$) of channels associated therewith, data bytes from the $n_1$ associated channels being time division multiplexed onto said associated input data line to provide on the associated input data line a bit stream having a first bit rate ($r_1$) comprising sequential bytes of binary data occurring in sequential time slots, each of the time slots being associated with a respective particular channel of the group of associated channels, said digital switching system selectively providing on said corresponding output data line an output bit stream comprising sequential bytes of binary data occurring in sequential relative time slots in accordance with the designated communicating channels, each of the time slots being associated with a respective particular channel of the associated group of channels, said digital switching system comprising:

a plurality of input circuits (IC's) each having a plurality of input ports adapted for coupling to respective ones of said input data lines, and a plurality of IC output terminals;

a plurality of companion way lines, at least one associated with each of said IC's for defining a second predetermined number ($n_2$) of input circuit groups, each of said input circuit groups comprising a third predetermined number ($n_3$) of IC's, each IC in the input circuit group being interconnected with the other IC's in the group by the companionway lines associated therewith, the respective IC's in the Xth one of the input circuit groups being herein nominally designated as IC(X,1), IC(X,1) ... IC(X,$n_3$), where X = 1,2 ... $n_2$;

each of said IC's including at least one means for time compressing the data bytes from a fourth predetermined number ($n_4$) of input data lines, and time-division-multiplexing the time compressed data bytes to form, on an associated companionway line, a relatively high speed bit stream having a second predetermined bit rate ($r_2$) where $r_2$ is at least equal to the product of $n_4$ and $r_1$ ($r_2 \geq n_4 \times r_1$), said relatively high speed bit stream comprising sequential time compressed data bytes occurring in successive compressed time slots;

each IC in an input circuit group further including a fifth predetermined number ($n_5$) of means, each associated with a respective one of said IC output terminals, for selectively coupling, in accordance with said respective designated communicating channels, a designated one of the companionway lines associated with the input circuit group to the associated IC output terminal during the respective compressed time slots;

a sixth predetermined number ($n_6$) of time slot interchange (TSI) circuits, each of said TSI circuits having at least said second predetermined number ($n_2$) of TSI input terminals, and at least said second predetermined number ($n_2$) of TSI output terminals, said TSI circuits being herein respectively nominally designated as TSI circuit (Y,Z), where Y = 1,2 ... $n_3$, and Z = 1,2 ... $n_5$, the input terminals of each TSI circuit (Y,Z) being respectively coupled to the Zth output terminal of each IC(X,Y) where X = 1,2 ... $n_2$;

each of said TSI circuits comprising means for generating a respective independent bit stream of sequential digital bits having a bit rate $r_3$ at each TSI output terminal, the TSI output terminal bit streams comprising data bytes applied to said TSI circuit from any of the IC output terminals coupled thereto, said data bytes occurring in the TSI output bit stream in a controllable designated sequence in accordance with said respective designated communicating channels;

said system further comprising a plurality of output circuits (OC's) each having at least said sixth predetermined number ($n_6$) of OC input terminals and having at least said fourth predetermined number ($n_4$) of output ports adapted for coupling to respective ones of said output data lines;

respective groups of at least said third predetermined number ($n_3$) of OC's being herein nominally designated respectively as output circuit group (X) where X equals 1,2 ... $n_2$), the respective input terminals of each OC in output circuit group (X) being respectively coupled to the Xth output terminal of each of said TSI circuits;

each said OC including at least one switching means, coupled to each of the OC input terminals, and having a switching means output terminal for selectively coupling, in accordance with said designated communicating channels, a designated one of said OC input terminals to the switching means output terminal during respective compressed time slots to generate a bit stream of sequential digital bits having a bit rate at least equal to said third bit rate ($r_3$) comprising sequential time compressed data bytes occurring during successive compressed time slots;

said OC's each further comprising means for demultiplexing and time expanding said compressed data bytes of the bit stream at said switching means output terminal onto said output data lines, to provide on each of the said data lines said output bit streams.

6. A digital switching system for selectively effecting data byte communication between respective designated communicating channels from a plurality of channels, said digital switching system being adapted for cooperation with a plurality of input data lines and corresponding output data lines, each input data line and corresponding output data line being associated with a respective group of a first predetermined number ($n_1$) of said channels, data bytes from each channel of the group of $n_1$ channels being time-division-multiplexed onto the associated input data line to form a bit stream on the associated input data line of sequential bits having a first predetermined bit rate ($r_1$), said digital switching system providing on said corresponding output data line a bit stream of sequential bits comprising time division multiplexed output data bytes to the particular channels of the group of $n_1$ associated channels, said digital switching system comprising:

a plurality of input circuits (IC), each having a plurality of input ports adapted for coupling to respective ones of said input data lines, and a plurality of IC output terminals associated therewith;

a plurality of companionway lines for defining a second predetermined number ($n_2$) of input circuit groups each IC in the input circuit group being interconnected with the other IC's of the input circuit group by the companionway lines associated with the IC's the respective IC's in the Xth one of said input circuit groups being herein nominally designated as IC(X,1), IC(X,2) ... IC(X,$n_3$), where X equals 1,2 ... $n_2$;

each IC in a given input circuit group comprising:
at least one group of a fourth predetermined number of ($n_4$) IC serial to parallel converters, each IC serial to parallel converter being coupled to a respective input data line and generating sequential sets of parallel signals, indicative of the time divisioned multiplexed data bytes on the associated input data line;
at least one IC parallel to serial converter associated with said group of IC serial to parallel converters, and associated with one of said companionways, for receiving sets of parallel signals applied thereto and generating on said associated companionway line a high speed bit stream of sequential digital bits at a bit rate at least $n_4$ times the first predetermined bit rate $r_1$, ($r_2 \geq n_4 \times r_1$);
means for selectively coupling the respective associated IC serial to parallel converters to said IC parallel to serial converter in predetermined sequence to effect generation by the IC parallel to serial converter of a high speed bit stream of sequential digital bits comprising the data bytes from said $n_4$ data lines, data bytes occurring on said $n_4$ input data lines in corresponding time slots occurring in said high speed bit stream in predetermined order in sequential compressed time slots;

a fifth predetermined number ($n_5$) of input circuit (IC) multiplex switches, each responsive to control signals applied thereto, and having a plurality of input terminals and an output terminal, for selectively providing an effective connection between a designated one of the input terminals thereof and the output terminal thereof, in accordance with said control signals, the input terminals of each of said $n_5$ multiplex switches being respectively connected to each of the companionway lines associated with the IC's of given input circuit group, the output terminal of the multiplex switches each being coupled to a respective IC output terminal; and means for generating control signals to said IC multiplex switches in accordance with said respective designated communicating channels to provide at said IC output terminals respective independent bit streams of sequential digital bits at said second predetermined bit rate ($r_2$) comprising sequential data bytes occurring in successive compressed time slots, the data byte in a given compressed time slot being selected from any of the data bytes provided in the given compressed time slot on any of the companionway lines associated with said input circuit group;

said system further including a sixth predetermined number ($n_6$) of time slot interchange (TSI) circuits each having at least said second predetermined number ($n_2$) of input terminals and at least said second predetermined number ($n_2$) of output terminals, said TSI circuits being herein respectively nominally designated as TSI circuits (Y,Z) where $Y=1,2 \ldots n_3$ and $Z=1,2 \ldots n_5$;

a plurality of inway lines coupling the input terminals of each TSI circuit (Y,Z) to the respective Zth output terminals of each IC(X,Y) where $X=1,2 \ldots n_2$;

each of said TSI circuits comprising:

a plurality of serial to parallel converters, each responsive to the bit stream on a respective inway line, for generating successive sets of parallel signals indicative of the successive data bytes of the bit stream of the inway line, a memory capable of storing indicia of a number of data bytes at least equal to the product of $n_1 \times n_4 \times n_2$;

means for selectively coupling respective ones of the TSI serial to parallel converters to said memory, to store in said memory indicia of sets of data bytes provided on the inway lines connected to the TSI circuit;

means for controllably reading out said memory to generate successive sets of parallel signals representative of designated ones said stored data bytes in a predetermined order in accordance with said respective designated communicating channels;

a plurality of parallel to serial converters, each associated with a respective TSI output terminal and responsive to successive sets of parallel signals applied thereto, for generating at the associated TSI output terminal a bit stream of sequential digital bits having said second predetermined bit rate $r_2$;

means for selectively applying said sets of parallel signals from said memory to the respective parallel to serial converters, to provide at each of said TSI output terminals an independent stream of sequential digital bits comprising sequential data bytes in successive compressed time slots, the data byte occurring during a given compressed time slot being selected from any of the data bytes having indicia stored in said memory;

said system further comprising a plurality of output circuits (OC) each having at least said sixth predetermined number ($n_6$) of input terminals and at least said fourth predetermined number ($n_4$) of output ports adapted for coupling with a respective output data line; and a plurality of outway lines for coupling the input terminals of groups of said OC's to particular TSI output terminals, at least said second predetermined number $n_2$ of output circuit groups being so defined, each output circuit group including at least said third predetermined number $n_3$ of OC's, the respective output circuit groups being herein nominally designated respectively as output circuit group (X), where $X=1,2 \ldots n_2$, the respective input terminals of each output circuit group (X) being respectively coupled to the Xth output terminal of each of said TSI circuits;

each of said OC's comprising:

at least one output multiplexing switch, responsive to control signals applied thereto, having a plurality of input terminals respectively coupled to the OC input terminals, and having a switch output terminal associated therewith, for selectively coupling a designated one of said outway lines to said switch output terminal during each compressed time slot in accordance with said control signals;

means for generating said control signals to said output multiplexing switch in accordance with said designated communicating channels to generate at said switch output terminal a bit stream of sequential digital bits having said second predetermined bit rate ($r_2$), comprising sequential data bytes occurring in successive compressed time slots, the data byte occurring during a given time slot being selected from any of the data bytes provided during the given time slot on any of said outway lines coupled to the OC, at least one OC serial to parallel converter coupled to said switch output terminal for generating successive sets of parallel signals indicative of the data bytes in the bit stream at said switch output terminal;

at least one group of said fourth predetermined number ($n_4$) OC parallel to serial converters, each associated with a respective output port and responsive to sets of parallel signals applied thereto, for providing a bit stream of sequential digital bits having said first bit rate ($r_1$) at said associated output port; and means for selectively applying the sets of parallel signals from the OC serial to parallel converter to respective ones of said group of OC parallel to serial converters, to generate respective output bit streams on said associated output data lines.

7. The system of claim 3, wherein said second bit rate $r_3$ is equal to said first bit rate $r_1$, ($r_1=r_2$) and said third bit rate $r_3$ is equal to said fourth bit rate $r_4$, ($r_3=r_4$).

8. The system of claim 3 wherein said input circuits each further comprise:

said fourth predetermined number ($n_4$) of random access memories (RAMS), each associated with a respective one of said multiplexer means, and having a respective memory location corresponding to each of said compressed time slots, for controllably storing, in the corresponding memory location, indicia of the particular companionway line providing the selected data byte for each respective compressed time slot.

9. The system of claim 3 wherein said TSI circuit comprises:

a first TSI random access memory (RAM), having at least one memory location corresponding to each compressed time slot at each TSI input terminal coupled to said TSI circuit, for storing indicia of each time compressed data byte occurring in each given compressed time slot at each of said TSI input terminals in the corresponding location;

a second TSI RAM having at least one location corresponding to each compressed time slot on each TSI output terminal, for storing in each of said locations indicia of the location of the selected stored data byte for the corresponding compressed time slot and TSI output terminal;

means for reading out the locations of said second TSI RAM in predetermined order, and generating successive sets of parallel signals indicative of the contents of the location in said first TSI RAM identified by the contents of the read out second TSI location; and a plurality of TSI parallel to serial (P to S) converters, one associated with each TSI output terminal, for receiving successive sets of parallel signals applied thereto and generating at the associated TSI output terminal a bit stream of sequential bits having said bit rate $r_4$, said bit stream comprising successive data bytes corresponding to said successive sets of parallel signals; and means for selectively applying said successive sets of parallel signals from said first TSI RAM to the respective TSI P to S converters.

10. The system of claim 3 wherein said input circuits each further comprise:

said fourth predetermined number ($n_4$) of random access memories (RAMS), each associated with a respective one of said first multiplexer means, and having a respective memory location corresponding to each of said compressed time slots, for controllably storing, in the corresponding memory location, indicia of the particular companionway line providing the selected data byte for each respective compressed time slot;

and wherein said TSI circuit comprises:

a first TSI random access memory (RAM) having at least one memory location corresponding to each compressed time slot at each IC output terminal coupled to said TSI circuit for storing indicia of each time compressed data byte occurring in each given compressed time slot at each of said IC output terminals in the corresponding location;

a second TSI RAM having at least one location corresponding to each compressed time slot on each TSI output terminal, for storing in each of said location indicia of the location of the selected stored data byte for the corresponding compressed time slot and TSI output terminal;

means for reading out the location of said second TSI RAM in predetermined order, and generating successive sets of parallel signals indicative of the contents of the location in said first TSI RAM identified by the contents of the read out second TSI location; and a plurality of TSI parallel to serial (P to S) converters, one associated with each TSI output terminal, for receiving successive sets of parallel signals applied thereto and generating at the associated TSI output terminal a bit stream of sequential bits having said bit rate $r_4$, said bit stream comprising successive data bytes corresponding to said successive sets of parallel signals; and means for selectively applying said successive sets of parallel signals from said first TSI RAM to the respective TSI P to S converters.

11. The system of claims 3, 7, 8, 9 or 10 wherein said means for generating control signals to said OC multiplexer means comprises:

an OC random access memory having at least one memory location corresponding to each of said compressed time slots for storing indicia of the designated TSI output terminal for the compressed time slot.

12. The system of claim 4, wherein said second bit rate $r_3$ is equal to said first bit rate $r_1$, ($r_1=r_2$) and said third bit rate $r_3$ is equal to said fourth bit rate $r_4$, ($r_3=r_4$).

13. The system of claim 6 wherein said means for generating control signals to said IC multiplex switches comprises:

said fifth predetermined number ($n_5$) of IC random access memories (RAMS), each associated with a respective IC multiplex switch, and having at least one memory location corresponding to each compressed time slot for storing indicia of the designated multiplex switch input terminal for the compressed time slot.

14. The system of claim 6 wherein said TSI memory includes at least one location corresponding to the data byte provided in each compressed time slot at each of the input terminals;

said means for controllably reading out said memory comprises:

a TSI control random access memory (RAM) having at least one memory location corresponding to each compressed time slot on each TSI output terminal, for storing indicia of the location in said TSI memory of a designated data byte.

15. The system of claim 6 wherein said means for generating said control signals to said output multiplexing switch comprises:

an OC random access memory having at least one memory location corresponding to each of said compressed time slots for storing indicia of the designated outway line terminal for the compressed time slot.

16. The system of claim 6 wherein said output circuit (OC) further comprises:

means for storing respective predetermined bytes of at least one message;

means responsive to control signals applied thereto for selectively applying during any given compressed time slot, a set of parallel signals indicative of a selected one of said predetermined message bytes to a selected one of said OC parallel to serial converters, to provide said selected predetermined message bytes in a selected output bit stream in a given time slot.

17. The system of claim 6 wherein each output circuit (OC) further comprises:
   a message RAM including at least one memory location corresponding to each of a seventh predetermined number ($n_7$) of predetermined messages;
   means for generating respective message bytes corresponding to said predetermined messages and selectively storing said message bytes in said message RAM location;
   means cooperating with said means for selectively applying the sets of parallel signals from the OC serial to parallel converters and responsive to message control signals applied thereto, for applying a set of parallel signals indicative of the contents of a designated one of said message RAM locations to a respective one of said OC parallel to serial converters during a given compressed time slot to provide said message byte in the output bit stream of the associated output port in a given time slot;
   said means for generating the control to the output multiplexing switch, including means for generating said message control signals.

18. The system of claim 17 wherein said means for generating control signals to said output multiplexing switch comprises:
   an OC control random access memory (RAM) having at least one memory location corresponding to each of said compressed time slots for storing indicia of one of a designated outway line or a designated message RAM location for the compressed time slot.

19. A digital switching system of claim 3 wherein each said output circuit (OC) further comprises means responsive to said means for generating said control signals to said OC multiplexer means for selectively applying signals indicative of predetermined message bytes to designated ones of said time expander means during designated compressed time slots.

20. The system of claim 4 further comprising:
   a redundant input circuit (IC) substantially identical to each of said plurality of input circuits;
   means for selectively connecting the input terminals of said redundant IC to the input terminals of any designated one of said plurality of IC's;
   IC comparator means, responsive to output signals from said designated one of said plurality of IC's and output signals from said redundant IC, for generating a signal indicative of deviations of the output signals of the designated one of said plurality of IC's from the redundant IC's.

21. The system of claim 4 further comprising:
   a redundant input circuit (IC) substantially identical to each of said $n_6$ TSI circuits;
   means for selectively connecting the input terminals of said redundant IC to the input terminals of any designated one of said $n_6$ TSI circuits;
   IC comparator means, responsive to output signals from said designated one of said $n_6$ TSI circuits and output signals from said redundant IC, for generating a signal indicative of deviations of the output signals of the designated one of said $n_6$ TSI circuits from the redundant IC's.

22. The system of claim 4 further comprising:
   a redundant input circuit (IC) substantially identical to each of said plurality of input circuits;
   means for selectively connecting the input terminals of said redundant IC to the input terminals of any designated one of said plurality of IC's;
   IC comparator means, responsive to output signals from said designated one of said plurality of IC's and output signals from said redundant IC, for generating a signal indicative of deviations of the output signals of the designated one of said plurality of IC's from the redundant IC's;
   a redundant input circuit (IC) substantially identical to each of said $n_6$ TSI circuits;
   means for selectively connecting the input terminals of said redundant IC to the input terminals of any designated one of said $n_6$ TSI circuits;
   IC comparator means, responsive to output signals from said designated one of said $n_6$ TSI circuits and output signals from said redundant IC, for generating a signal indicative of deviations of the output signals of the designated one of said $n_6$ TSI circuits from the redundant IC's.

23. The system of claims 4, 20 or 21 further comprising:
   a redundant output circuit (OC) substantially identical to each of said plurality of output circuits;
   means for selectively connecting the input terminals of said redundant OC to the input terminals of any designated one of said plurality of OC's;
   OC comparator means, responsive to output signals from said designated one of said plurality of OC's and output signals from said redundant OC, for generating a signal indicative of deviations of the output signals of the designated one of said plurality of OC's from the redundant OC's.

* * * * *